United States Patent [19]

Itoh et al.

[11] Patent Number: 5,013,985
[45] Date of Patent: May 7, 1991

[54] MICROCOMPUTER WITH MOTOR CONTROLLER CIRCUIT

[75] Inventors: Mitsuhiro Itoh; Hideo Matsui, both of Suita, Japan

[73] Assignee: Mitsubishi Denki Kabushiki Kaisha, Tokyo, Japan

[21] Appl. No.: 514,390

[22] Filed: Apr. 25, 1990

[30] Foreign Application Priority Data

Aug. 3, 1989 [JP] Japan .................... 1-203215

[51] Int. Cl.[5] ............ H02P 6/02; H02M 7/48
[52] U.S. Cl. ..................... 318/558; 318/254; 318/599
[58] Field of Search ............ 318/138, 254, 439, 558, 318/599; 310/68 R, DIG. 6

[56] References Cited

U.S. PATENT DOCUMENTS

| | | | |
|---|---|---|---|
| 4,072,883 | 2/1978 | Beiter | 318/257 |
| 4,105,939 | 8/1978 | Culbertson | 318/599 |
| 4,599,545 | 7/1986 | Moriki et al. | 318/599 X |
| 4,743,815 | 5/1988 | Gee et al. | 318/254 |
| 4,760,317 | 7/1988 | Hetzel et al. | 318/254 |

*Primary Examiner*—Bentsu Ro
*Attorney, Agent, or Firm*—Townsend and Townsend

[57] ABSTRACT

A microcomputer with a motor controller circuit includes a motor controller circuit (4) which has NAND circuits (8) for producing a logical product of a rise pulse from a rise pulse generator (5) and a start level from a register (7) and flip-flop circuits (9a-9b) each responsive to start level set signals from the NAND circuits and an output pulse from a three-phase inverter waveform generator timer (6a-6b) to generate three-phase inverter waveforms.

7 Claims, 4 Drawing Sheets

MICROCOMPUTER WITH MOTOR CONTROLLER CIRCUIT

BACKGROUND OF THE INVENTION

The present invention relates to microcomputers having a motor controller circuit for controlling a three-phase inverter motor.

A conventional three-phase inverter motor controlling circuit is shown in FIG. 4. A microcomputer 1 includes a central processing unit (CPU), a read only memory (ROM), a random access memory (RAM), a timer, and an oscillator for generating clock pulses, all of which are provided on a single chip. A gate array or additional circuit 2 converts the waveforms of pulse width modulation signals outputted from the microcomputer 1 into inverter output waveforms.

As shown in FIG. 5, the microcomputer 1 and the additional circuit 2 are mounted on a printed circuit board 3 to form a motor controller unit.

In operation, the PWM signals from the microcomputer 1 are converted by the additional circuit 2 into three-phase inverter waveforms or motor drive signals in phases U-W for controlling the motor. This conventional circuit, however, requires a gate array and an additional circuit which uses many components. The motor controlling unit shown in FIG. 5 requires a large mounting area, and is sensitive to noise and high in the unit manufacturing cost.

SUMMARY OF THE INVENTION

Accordingly, it is an object of the invention to provide a single-chip microcomputer with a motor controller circuit which is resistant to noise and low in the unit manufacturing cost.

According to the invention there is provided a microcomputer with a motor controller circuit, which includes a microcomputer having a central processing unit, a memory, a timer, and a clock for generating clock pulses, the timer including a rise pulse generator in response to the clock pulses to generate rise pulses; and three three-phase inverter waveform generation timers responsive to the rise pulses to generate output pulses; and a motor controller circuit incorporated in the microcomputer, the motor controller circuit including a register in which the CPU sets start levels for the three-phase inverter waveform generation timers; three pairs of NAND circuits for producing a logical product of the rise pulse and said start level; and three flip-flop circuits responsive to start level set signals from the NAND circuits and an output pulse from the three-phase inverter waveform generation timer to generate three-phase inverter waveforms.

The above and other objects, features, and advantages of the invention will become more apparent from the following description when taken in conjunction with the accompanying drawings.

DESCRIPTION OF THE PREFERRED EMBODIMENT

Figure 1:
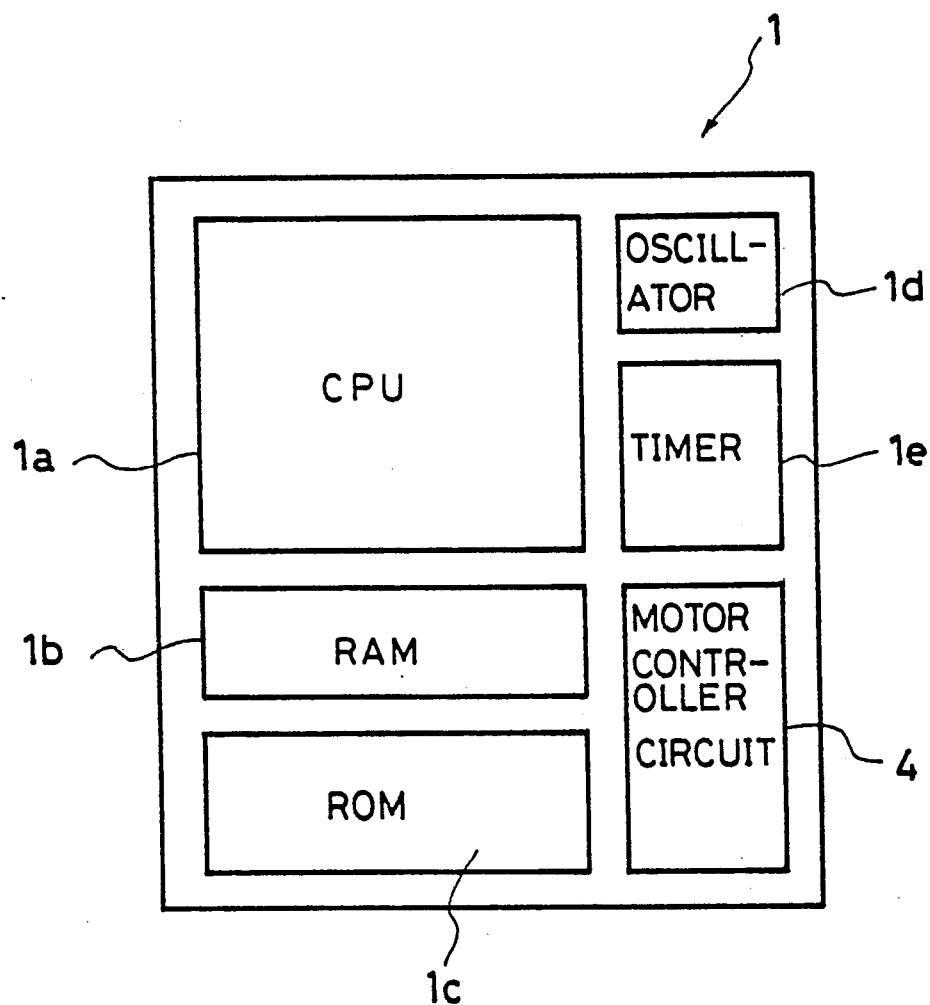
FIG. 1 is a top plan view of a chip on which a microcomputer with a motor controller circuit is fabricated according to an embodiment of the invention.

In FIG. 1, the microcomputer 1 includes a CPU 1a, a RAM 1b, a ROM 1c, an oscillator 1d, a timer 1e, and a motor controller circuit 4, all of which are patterned on a single chip.

Figure 2:
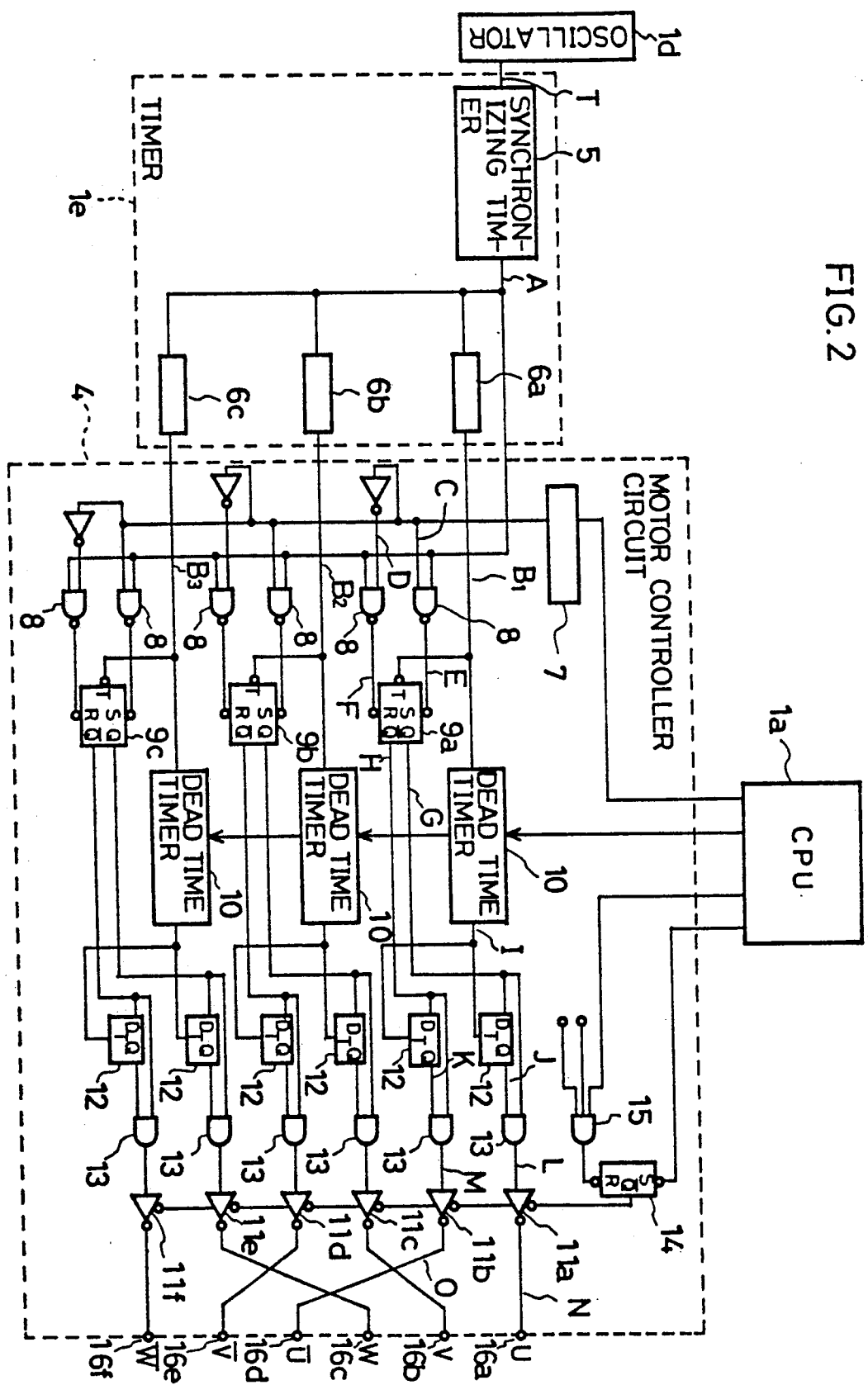
FIG. 2 is a block diagram of the motor controller circuit of FIG. 1.

In FIG. 2, the motor controller circuit 4 includes a synchronizing timer 5 for generating rise pulses A in a timer mode in response to a clock signal T from the oscillator 1d; three three-phase inverter waveform generation timers 6a-6c responsive to the rise pulses A to generate output pulses $B_1$-$B_3$ used in a one-shot pulse output mode; a pulse output waveform start level set register 7 in which the CPU 1a sets start levels C and D for the three-phase inverter waveform generation timers 6a-6c; three pairs of NAND circuits 8 for producing a logical product of the rise pulse A and the start level C or D; three flip-flop circuits 9a-9c for generating three-phase inverter waveforms G and H in response to the start level set signals E and F from the NAND circuits 8 and the respective output pulses $B_1$-$B_3$ from the three-phase inverter waveform generation timers; three dead time timers 10 for setting a dead time period ($t_D$) in which both the three-phase inverter waveforms G and H are turned off so as to prevent any short circuit between respective output buffers 11a-11f; six dead time flip-flop circuits 12 for setting the above off time period; six first AND circuits 13; and a control flip-flop 14 responsive to a control signal outputted from the CPU 1a via a second AND circuit 15 to control the output buffers 11a-11f. Part of the timer 1e in the microcomputer 1 is allocated for the synchronizing timer 5 and the three-phase inverter waveform generation timers 6a-6c.

Figure 3:
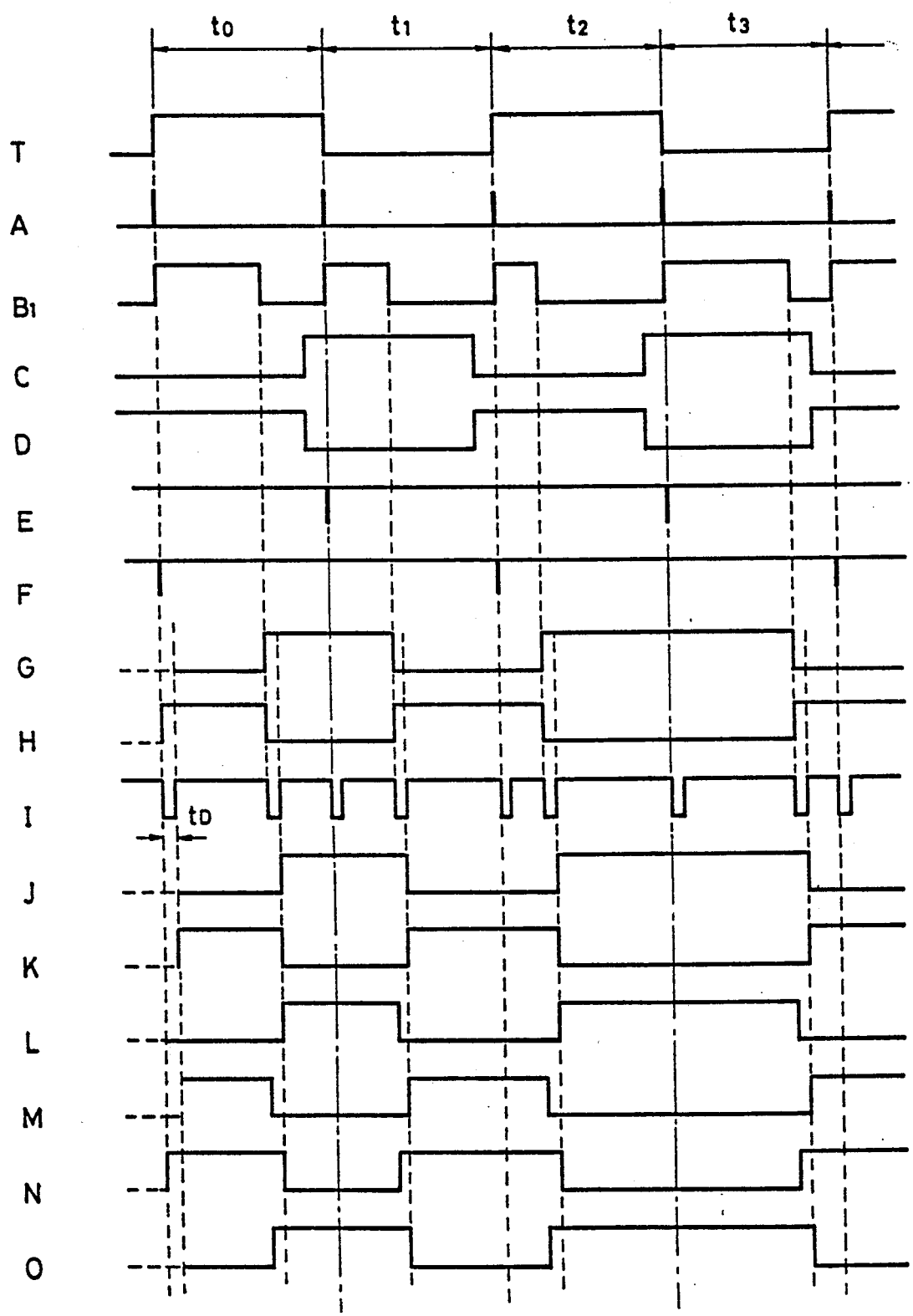
FIG. 3 is a timing chart of the motor controller circuit of FIG. 1.
Figure 4:
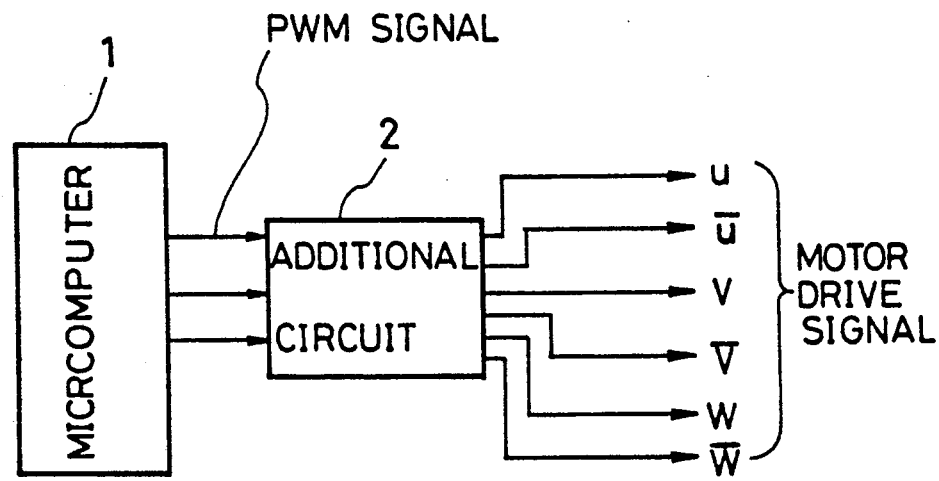
FIG. 4 is a block diagram of a conventional three-phase inverter motor controlling circuit.
Figure 5:
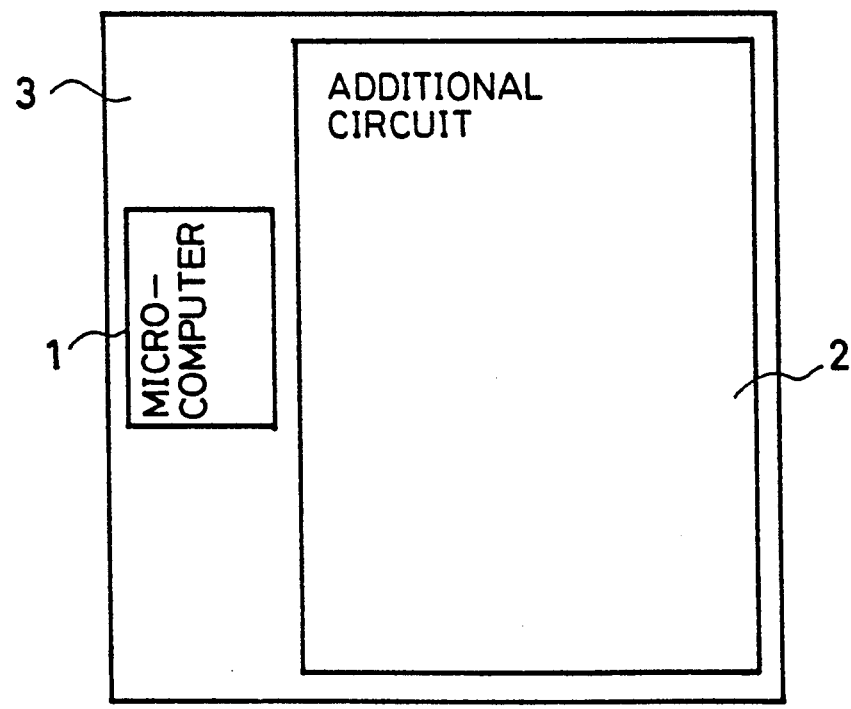
FIG. 5 is a top plan view of a conventional motor controller unit.

The operation is described with reference to FIG. 3. Clock pulses T from the oscillator 1d are converted to one-shot rise pulses A by the synchronizing timer 5. In response to the rise pulses A, the first three-phase inverter waveform generation timer 6a starts to output PWM pulses $B_1$. In response to the start levels C and D from the register 7 and the rise pulses A, the NAND circuits 8 provide start level set signals E and F. In response to the start level set signals E and F, the first flip-flop circuit 9a changes the output pulses $B_1$ from the three-phase inverter waveform generation timer 6a to the set start level. That is, the start level set signals E and F determine whether the output pulses B should be inverted or not, and the start levels of the output pulses $B_1$ are inverted at $t_0$ and $t_2$ to provide three-phase inverter waveforms G and H which consists of wide pulses of different frequencies.

The CPU 1a sets the dead time $t_D$ in the dead time timer 10, and the dead time pulses I are outputted in synchronism with the output pulses $B_1$. In response to the dead time pulses I and the three-phase inverter waveforms G and H, the dead time flip-flop circuit 12 provides waveforms J and K which are shifted by the dead time $t_D$. The waveforms J and K and the three-phase inverter waveforms G and H are combined in the first NAND circuit 13 to form three-phase inverter waveforms L and M with an off period. These three-phase inverter waveforms are outputted via the output buffers 11a and 11b to the terminals 16a and 16d as motor drive signals in phases U and U which have waveforms N and O, respectively. Similarly, motor drive signals in phases V, V and W, W are outputted at respective terminals 16b–16f in response to output pulses $B_2$ and $B_3$ from the timers 6b and 6c. In this way, three-phase inverter waveforms are generated.

Alternatively, the synchronizing timer 5 of the timer 1e may be replaced by any device which is able to generate one-shot rise pulses A from clock pulses T. The three-phase inverter waveform generation timers 6a–6c may be used a PWM or continuous pulse output mode to produce the substantially same results. The respective timers 5 and 6a–6c may be incorporated in the motor controller circuit 4.

As has been described above, since a motor controller circuit for outputting three-phase inverter waveforms is incorporated in a microcomputer, which includes a CPU, memories, timers, and a clock, on a single-chip, it is possible to reduce not only the number of components, thus the unit manufacturing cost, too, but also the mounting area, and put the unit in the same package to provide high resistance to noise.

We claim:

1. A microcomputer with a motor controller circuit, which comprises:
    a microcomputer including a central processing unit, a memory, a timer, and a clock for generating clock pulses, said timer including:
    a rise pulse generator in response to said clock pulses to generate rise pulses; and
    three three-phase inverter waveform generation timers responsive to said rise pulses to generate output pulses; and
    a motor controller circuit incorporated in said microcomputer, said motor controller circuit including:
    a register in which said CPU sets start levels for said three-phase inverter waveform generation timers;
    three pairs of NAND circuits for producing a logical product of said rise pulse and said start level; and
    three flip-flop circuits responsive to start level set signals from said NAND circuits and an output pulse from said three-phase inverter waveform generation timer to generate a three-phase inverter waveform.

2. The microcomputer with a motor controller circuit of claim 1, wherein said rise pulse generator is a synchronizing timer which is used in a timer mode to convert clock pulses to one-shot rise pulses.

3. The microcomputer with a motor controller circuit of claim 1, wherein said three-phase inverter waveform generation timers are used in a one-shot pulse output mode.

4. The microcomputer with a motor controller circuit of claim 1, wherein said three-phase inverter waveform generation timers are used in a pulse width modulation mode.

5. The microcomputer with a motor controller circuit of claim 1, wherein said three-phase inverter waveform generation timers are used in a continuous pulse output mode.

6. The microcomputer with a motor controller circuit of claim 1, wherein said rise pulse generator and said three-phase inverter waveform generation timers are assigned to part of said timer within said microcomputer.

7. The microcomputer with a motor controller circuit of claim 1, wherein said flip-flop circuits are clocked to be responsive to start level set signals inputted to S and R terminals from said NAND circuits and an output pulse inputted to a T terminal from said three-phase inverter waveform generation timer to output three-phase inverter waveforms at Q and Q terminals.

* * * * *